Patented Dec. 16, 1941

2,266,514

UNITED STATES PATENT OFFICE 2,266,514

ESTERS OF DITHIOPHOSPHORIC ACIDS

Charles J. Romieux, Scarsdale, N. Y., and Kenneth D. Ashley, Fairfield, Conn., assignors to American Cyanamid Company, New York, N. Y., a corporation of Maine No Drawing. Application September 9, 1938, Serial No. 229,088

3 Claims. (Cl. 260—461)

This invention relates to thioesters of dithiophosphoric acids.

In the past, a number of dithiophosphoric acids have been prepared having the general formula:

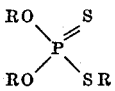

in which R is an alkyl, aryl or hydroaryl radical. These compounds, either in the form of the acid or in the form of their salts, have found extensive commercial use as collectors in the froth flotation of ores and also are accelerators for the vulcanization of rubber.

According to the present invention, the hydrogen of the SH group is replaced by an organic radical to form the corresponding thioesters having the formula:

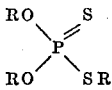

in which R' is an organic radical such as alkyl, aryl, acyl, and the like.

The present invention is not limited to esters of a particular dithiophosphoric acid but is generally applicable to thioesters of any dithiophosphoric acid in which R may be any of the alkyl, aryl, or hydroaryl radicals and one R may be one radical and the other R another, or both may be the same. Among the acids of immediate commercial importance because of their cheapness are the diethyl, diosopropyl, disecondary butyl, diamyl, diphenyl, dicresyl, dixylenyl and dinaphthyl dithiophosphoric acids.

The radical R' may be an alkyl radical such as methyl, ethyl, isopropyl, butyl, amyl and the like, either substituted or unsubstituted; may be an aralkyl radical such as benzyl, styryl, phenylethyl; may be an acyl group such as acetyl, propionyl, benzoyl, ethoxyformyl; or may be an aryl such as phenyl, tolyl, naphthyl and the like. It is also possible to produce esters in which two dithiophosphoric acids are linked to the same alkyl radical. These have the formula:

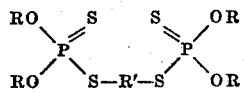

Another way of looking at the compounds is that R' (of the first formula) may also be a dithiophosphoalkyl.

While the invention is not broadly limited to any particular method of preparing the new esters, we have found that they can be readily prepared in solution by reacting a salt of the dithio acids, such as the alkali metal or ammonium salt, with a halide of the radical which is to be introduced.

Example 1

1 mol of ammonium diisopropyl dithiophosphate was dissolved in anhydrous ethyl alcohol and treated with 1 mol of amyl chloride. The mixture was boiled under a reflux condenser for 8 hours, ammonium chloride separated out and excess alcohol was distilled off under a vacuum. The residue was washed several times with water and dried with anhydrous sodium sulfate and constitutes the amyl ester of diisopropyl dithiophosphoric acid:

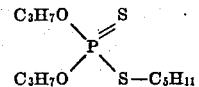

Example 2

1 mol of ammonium diisopropyl dithiophosphate was reacted with 1 mol of ethylene dichloride by refluxing an acetone solution. Ammonium chloride and unreacted ethylene chloride and alcohol were removed by filtration and vacuum distillation, and the residue washed with water and dried, producing beta chlorethyl diisopropyl dithiophosphate:

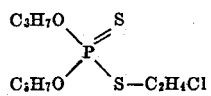

Example 3

1 mol of ammonium diisopropyl dithiophosphate was refluxed in acetone solution with 1 mol of ethyl iodide until reaction ceased. The ethyl ester of diisopropyl dithiophosphoric acid was produced and purified as described above, the product having the following formula:

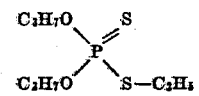

Example 4

1 mol of the ammonium dicresyl dithiophosphate was refluxed in acetone solution with 1 mol of ethyl iodide until reaction ceased. The ethyl ester of dicresyl dithiophosphoric acid was produced and purified as described above and has the following formula:

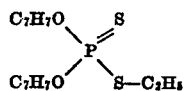

Example 5

1 mol of ammonium diisopropyl dithiophosphate was refluxed in acetone solution with benzyl chloride until reaction ceased and the resulting benzyl diisopropyl dithiophosphate recovered and purified as described in Example 1. It has the following formula:

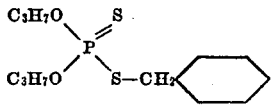

Example 6

1 mol of ammonium diisopropyl dithiophosphate was refluxed in acetone with 1 mol of acetyl chloride. Acetyl diisopropyl dithiophosphate was produced:

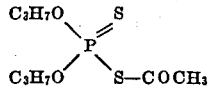

Example 7

1 mol of ammonium diethyl dithiophosphate was refluxed with ethyl chlorformate producing the ethoxyformyl ester of diethyl dithiophosphoric acid which was recovered and purified as described in Example 1 and which has the following formula:

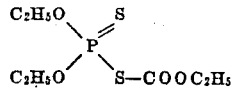

Example 8

1 mol of sodium diisopropyl dithiophosphate was mixed with 1 mol of ethylene chlorhydrin in 40% water solution. The solution was heated slowly until a liquid began to separate, the reaction being quite rapid at 90° C. The solution was then treated with a decolorizing carbon, filtered and again heated, and the ester separated. A yield of approximately 86.5% of theory was obtained of the beta oxyethyl diisopropyl dithiophosphate:

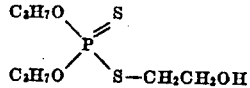

Example 9

The product of Example 2 was heated with an additional amount of ammonium diisopropyl dithiophosphate. A fair yield of ethylene tetraisopropyl tetrathiodiphosphate was obtained having the following formula:

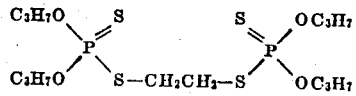

What we claim is:

1. Thioesters of disubstituted dithiophosphoric acids having the following general formula:

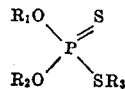

where $R_1$ and $R_2$ are each a member of the group consisting of alkyl radicals, hydroaryl radicals, and aryl radicals and $R_3$ is an aralkyl radical.

2. Thioesters of disubstituted dithiophosphoric acids having the following general formula:

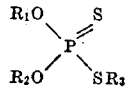

where $R_1$ and $R_2$ are alkyl radicals and $R_3$ is an aralkyl radical.

3. The thio ester of a disubstituted dithiophosphoric acid having the following formula:

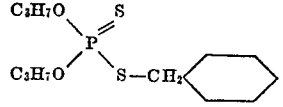

CHARLES J. ROMIEUX.
KENNETH D. ASHLEY.